United States Patent
Caron L'Ecuyer et al.

(10) Patent No.: US 11,007,636 B2
(45) Date of Patent: May 18, 2021

(54) ARTICULATED MECHANISM WITH PROTECTIVE SLEEVE AT JOINT

(71) Applicant: KINOVA INC., Boisbriand (CA)

(72) Inventors: Louis Joseph Caron L'Ecuyer, Blainville (CA); Philippe Fauteux, Boisbriand (CA); Alexandre Picard, Boisbriand (CA); Sebastien Messier, Boisbriand (CA)

(73) Assignee: KINOVA INC., Boisbriand (CA)

( * ) Notice: Subject to any disclaimer, the term of this patent is extended or adjusted under 35 U.S.C. 154(b) by 0 days.

(21) Appl. No.: 16/496,200

(22) PCT Filed: Mar. 28, 2018

(86) PCT No.: PCT/CA2018/050379
§ 371 (c)(1),
(2) Date: Sep. 20, 2019

(87) PCT Pub. No.: WO2018/176141
PCT Pub. Date: Oct. 4, 2018

(65) Prior Publication Data
US 2020/0055181 A1    Feb. 20, 2020

Related U.S. Application Data

(60) Provisional application No. 62/479,841, filed on Mar. 31, 2017.

(51) Int. Cl.
*B25J 17/00* (2006.01)
*B25J 17/02* (2006.01)
(Continued)

(52) U.S. Cl.
CPC .......... *B25J 9/0009* (2013.01); *B25J 17/025* (2013.01); *B25J 19/0075* (2013.01)

(58) Field of Classification Search
CPC .......... B25J 17/025; B25J 9/08; B25J 19/0075
See application file for complete search history.

(56) References Cited

U.S. PATENT DOCUMENTS 5,155,423 A * 10/1992 Karlen ................. B25J 9/04
                                                    318/568.1
5,178,032 A *  1/1993 Zona .................. B25J 17/025
                                                    74/479.01
(Continued)

FOREIGN PATENT DOCUMENTS

CA        2045487 A1     7/1990
CA        1324404 C     11/1993
(Continued)

*Primary Examiner* — Jake Cook
(74) *Attorney, Agent, or Firm* — Norton Rose Fulbright Canada LLP (57) ABSTRACT

An assembly of links and motorized joint unit of a mechanism comprises one or more pairs of links, each said link having a tubular body, at least one end of each of the tubular body being an open end having at least one connector. A motorized joint unit has a first portion received in the open end of the tubular body of a first of the links, the motorized joint unit secured to the at least one connector of the first of the links, a second portion rotatable relative to the first portion by actuation of the motorized joint unit, the second portion received in the open end of the tubular body of a second of the links, the motorized joint unit secured to the at least one connector of the second of the links. A protective sleeve has a tubular body rotatably mounted over the at least one connector of each of the first and the second link, the protective sleeve concealing the connectors and a joint between the pair of links.

20 Claims, 9 Drawing Sheets

(51) Int. Cl.
    *B25J 18/00*     (2006.01)
    *B25J 9/00*     (2006.01)
    *B25J 19/00*     (2006.01)

(56) References Cited

U.S. PATENT DOCUMENTS

| | | | |
|---|---|---|---|
| 6,084,373 A * | 7/2000 | Goldenberg | B25J 9/08 |
| | | | 318/568.11 |
| 9,126,332 B2 | 9/2015 | Caron L'Ecuyer et al. | |
| 9,677,602 B1 * | 6/2017 | Baghdasarian | B25J 19/0075 |
| 2005/0016008 A1 * | 1/2005 | Raab | B25J 19/0016 |
| | | | 33/503 |
| 2009/0114052 A1 * | 5/2009 | Haniya | B25J 9/126 |
| | | | 74/490.03 |
| 2011/0257786 A1 * | 10/2011 | Caron L'Ecuyer | B25J 17/025 |
| | | | 700/258 |
| 2012/0222324 A1 | 9/2012 | Raab et al. | |
| 2013/0340560 A1 * | 12/2013 | Burridge | B25J 17/025 |
| | | | 74/490.05 |
| 2015/0190934 A1 * | 7/2015 | Chiu | B25J 9/08 |
| | | | 74/490.01 |
| 2017/0217025 A1 * | 8/2017 | Okada | B25J 17/00 |
| 2018/0182260 A1 * | 6/2018 | Ciniello | G09B 19/0053 |

FOREIGN PATENT DOCUMENTS

| | | |
|---|---|---|
| CA | 2213287 A1 | 2/1999 |
| CA | 2739727 A1 | 4/2010 |
| EP | 1129828 A1 | 9/2001 |
| WO | 8501496 A1 | 4/1985 |
| WO | 8803856 A1 | 6/1988 |
| WO | 9311914 | 6/1993 |
| WO | 2010060561 A1 | 6/2010 |
| WO | 2011047724 A1 | 4/2011 |

* cited by examiner

ARTICULATED MECHANISM WITH PROTECTIVE SLEEVE AT JOINT

CROSS-REFERENCE TO RELATED APPLICATION

The present application claims the priority of U.S. Provisional Patent Application Ser. No. 62/479,841, filed on Mar. 31, 2017 and incorporated herein by reference.

TECHNICAL FIELD

The present application relates to mechanisms such as articulated mechanisms and robot arms and to an assembly thereof.

BACKGROUND OF THE ART

Robotic arms are increasingly used in a number of different applications, from manufacturing, to servicing, and assistive robotics, among numerous possibilities. In some applications, the robot arms are exposed to their environments, whereby the robot arms must be configured in such a way that their components are shielded from liquids and debris. The challenge is to shield joints between robot arm links. However, such shielding must nonetheless be esthetically pleasing, as opposed to being bulky and cumbersome.

SUMMARY

It is an aim of the present disclosure to provide a mechanism such as a robot arm that addresses issues related to the prior art.

Therefore, in accordance with the present disclosure, there is provided an assembly of links and motorized joint unit of a mechanism, comprising: at least pair of links, each said link having a tubular body, at least one end of each of the tubular body being an open end having at least one connector; a motorized joint unit having a first portion received in the open end of the tubular body of a first of the links, the motorized joint unit secured to the at least one connector of the first of the links, a second portion rotatable relative to the first portion by actuation of the motorized joint unit, the second portion received in the open end of the tubular body of a second of the links, the motorized joint unit secured to the at least one connector of the second of the links; and a protective sleeve having a tubular body rotatably mounted over the at least one connector of each of the first and the second link, the protective sleeve concealing the connectors and a joint between the pair of links.

Further in accordance with the present disclosure, the protective sleeve and a portion of each of the links adjacent to the protective sleeve all have for instance a constant outer diameter.

Still further in accordance with the present disclosure, the at least one connector of each of the links is for instance secured to a respective one of the first portion and of the second portion of the motorized joint unit by at least one fastener.

Still further in accordance with the present disclosure, the protective sleeve has for instance a single hole in an outer lateral surface thereof, the single hole being axially aligned with the at least one fastener of either one of the first link and the second link.

Still further in accordance with the present disclosure, a plug is for instance received in the hole to plug the hole.

Still further in accordance with the present disclosure, the plug is for instance made of a polymeric material.

Still further in accordance with the present disclosure, the protective sleeve has for instance at least one hole in an outer lateral surface thereof, the at least one hole being axially aligned with the at least one fastener of either one of the first link and the second link.

Still further in accordance with the present disclosure, each of the connector has for instance an annular base extending from a remainder of the tubular body, a diameter of the annular based being less than an outer diameter of a portion of the tubular body from which the annular base projects, to form a step.

Still further in accordance with the present disclosure, an annular channel is for instance defined in the annular base, an annular seal being received in the annular channel for sealing a junction between the protective sleeve and the annular base.

Still further in accordance with the present disclosure, each of the connector has for instance a plurality of tabs projecting axially from the tubular body, the tabs having fasteners holes for receiving fasteners to secure the links to the motorized joint unit.

Still further in accordance with the present disclosure, the tabs are for instance sized to elastically deform when secured to the motorized joint unit by the fasteners.

Still further in accordance with the present disclosure, at least two of the fasteners holes have for instance different diameters.

Still further in accordance with the present disclosure, a first series of the fasteners holes receives for instance alignment set screws with tapering end, the motorizing joint unit having a hole with corresponding tapering geometry.

Still further in accordance with the present disclosure, a set of key and keyseat are for instance between the links and the corresponding ones of the first portion and of the second portion of the motorized joint unit for rotational alignment.

Still further in accordance with the present disclosure, the protective sleeve is for instance made of a rigid material having a constant outer diameter.

Still further in accordance with the present disclosure, the connector of the first link at the motorized joint is for instance a mirror image of the connector of the second link at the motorized joint.

Still further in accordance with the present disclosure, the connector of the first link at the motorized joint is for instance the same as the connector of the second link at the motorized joint.

Still further in accordance with the present disclosure, the motorized joint unit has for instance a pair of end flanges at a junction between the first portion and the second portion, the connectors of the links abutting against the end flanges.

Still further in accordance with the present disclosure, the protective sleeve is for instance connected to one of the first link to rotate with the first link relative to the second link.

Still further in accordance with the present disclosure, each of the links has for instance one said connector at each end, wherein the connectors at opposed ends of any one of the links have a same diameter.

DETAILED DESCRIPTION

Figure 1:
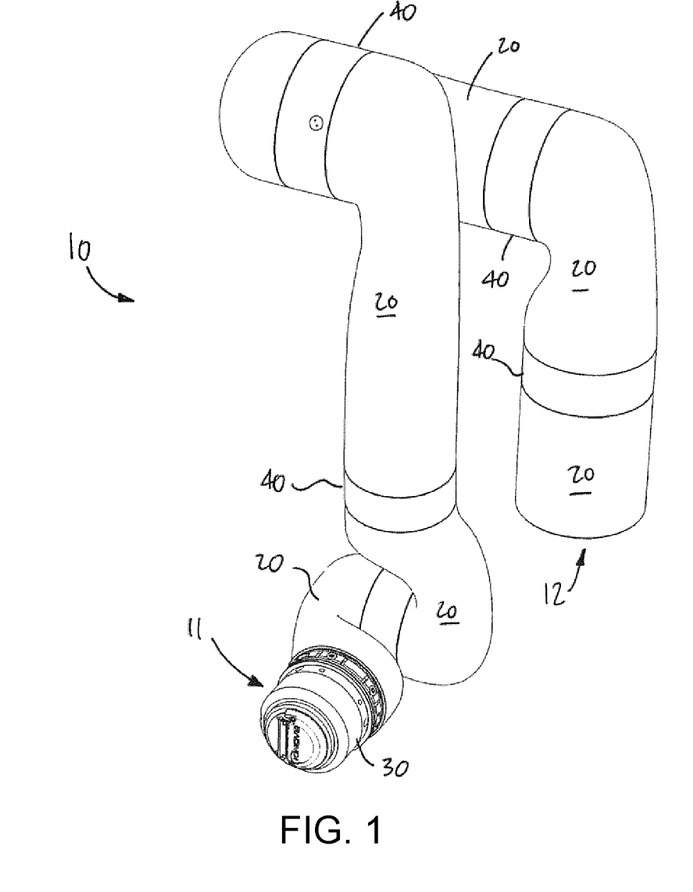
FIG. 1 is a perspective view of an articulated robot arm in accordance with an embodiment of the present disclosure.

Referring to the drawings and more particularly to FIG. 1, a mechanism such as robot arm in accordance with the present disclosure is generally shown at 10. Although the protective sleeve and joint configuration described herein are shown on the robot arm 10, they may be used with other mechanisms, such as articulated mechanisms or arms, serial mechanisms or arms, parallel mechanisms or arms, or like mechanisms or arms. However, for simplicity, the expression "robot arm" is used throughout, but in a non-limiting manner. The robot arm 10 is a serial articulated robot arm, having an effector end 11 and a base end 12. The effector end 11 is configured to receive any appropriate tool, such as gripping mechanism or gripper, anamorphic hand, tooling heads such as drills, saws, an instrument drive mechanism, etc. The end effector secured to the effector end 11 is as a function of the contemplated use. However, the robot arm 10 is shown without any such tool in FIG. 1, a motorized joint unit being shown instead, and ready for supporting a tool. The motorized joint unit is tasked with driving the end effector. The base end 12 is configured to be connected to any appropriate structure or mechanism. The base end 12 may be rotatably mounted or not to the structure or mechanism. By way of a non-exhaustive example, the base end 12 may be mounted to a wheelchair, to a vehicle, to a frame, to a cart, to a robot docking station. Although a serial robot arm is shown, the joint arrangement of the robot arm 10 may be found in other types of robots, included parallel manipulators.

The robot arm 10 has a series of links 20 (a.k.a., shells, tubes, tubular members, etc), interconnected by motorized joint units 30 (one shown in FIG. 1), with protective sleeves 40 at the junction between adjacent links 20:

The links 20 define the majority of the outer surface of the robot arm 10. The links 20 also have a structural function in that they form the skeleton of the robot arm 10 (i.e., an outer shell skeleton), by supporting the motorized joint units 30 and tools at the effector end 11, with loads supported by the tools, in addition to supporting the weight of the robot arm 10 itself. Wires and electronic components may be concealed into the links 20, by internal routing.

The motorized joint units 30 interconnect adjacent links 20, in such a way that a rotational degree of actuation is provided between adjacent links 20. According to an embodiment, the motorized joint units 30 may also connect a link to a tool at the effector end 11, or to a base at the base end 12, although other mechanisms may be used at the effector end 11 and at the base end 12. The motorized joint units 30 may also form part of the structure of the robot arm 10, as they interconnect adjacent links 20, and hence have a structural responsibility.

The protective sleeves 40 shield the junction between pairs of adjacent links 20, e.g., in a water, fluid and particle resistant manner. As shown in the Figures, the protective sleeves 40 may be fastener-less, in that they are not retained by fasteners. Moreover, the protective sleeves 40 may form a continuous fastener-less surface from one link 20 to another, as explained hereinafter. With the protective sleeves 40 installed and plugged, the robot arm 20 may therefore conceal all structural fasteners, i.e., fasteners tasked with interconnecting structural components of the robot arm 10.

Figure 2:
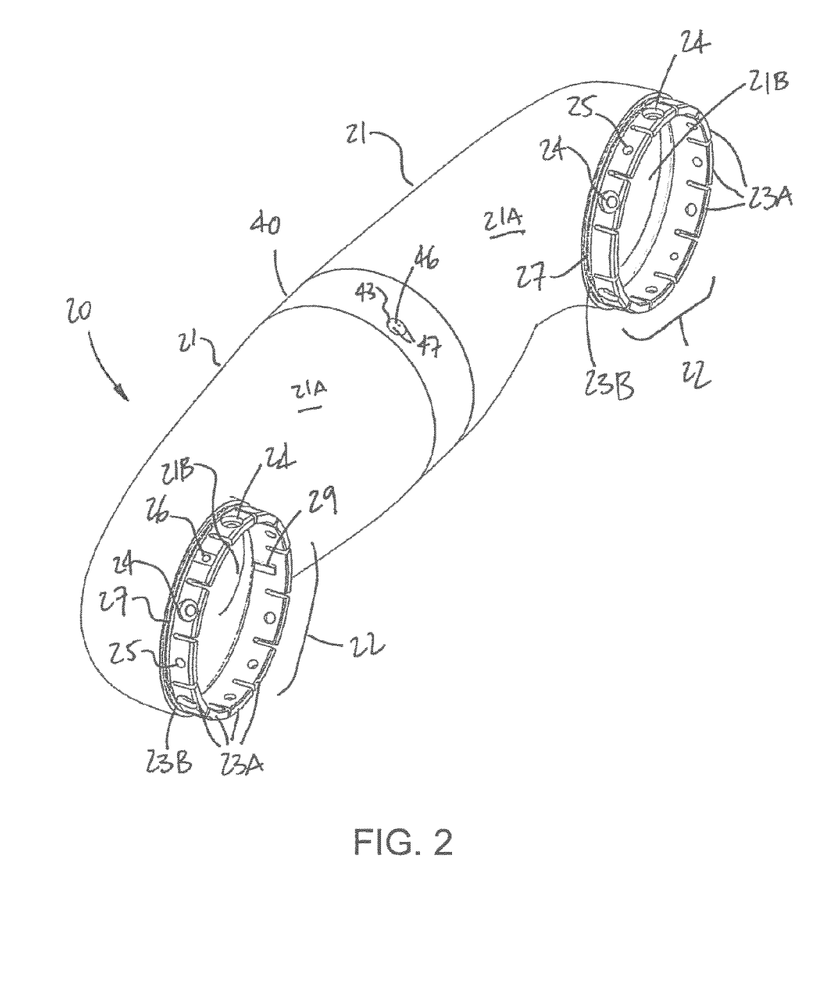
FIG. 2 is a perspective view of a pair of links of the robot arm in FIG. 1, with a protective sleeve in accordance with the present disclosure between the links.
Figure 3:
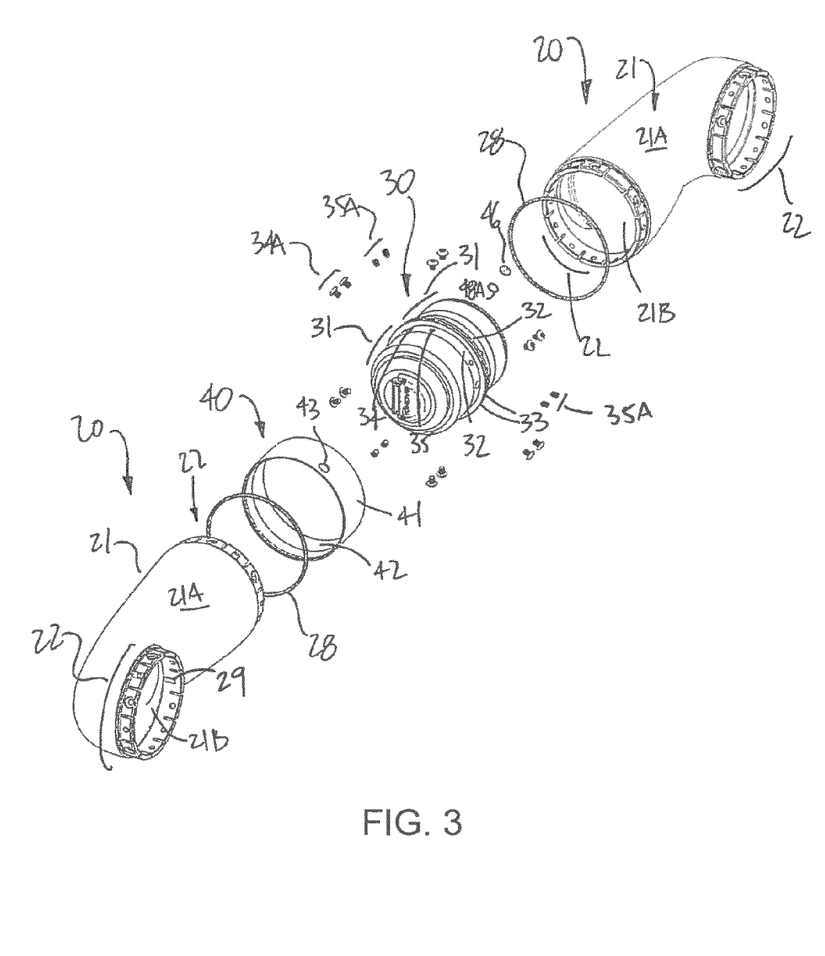
FIG. 3 is an assembly view of the pair of links of FIG. 2.
Figure 4:
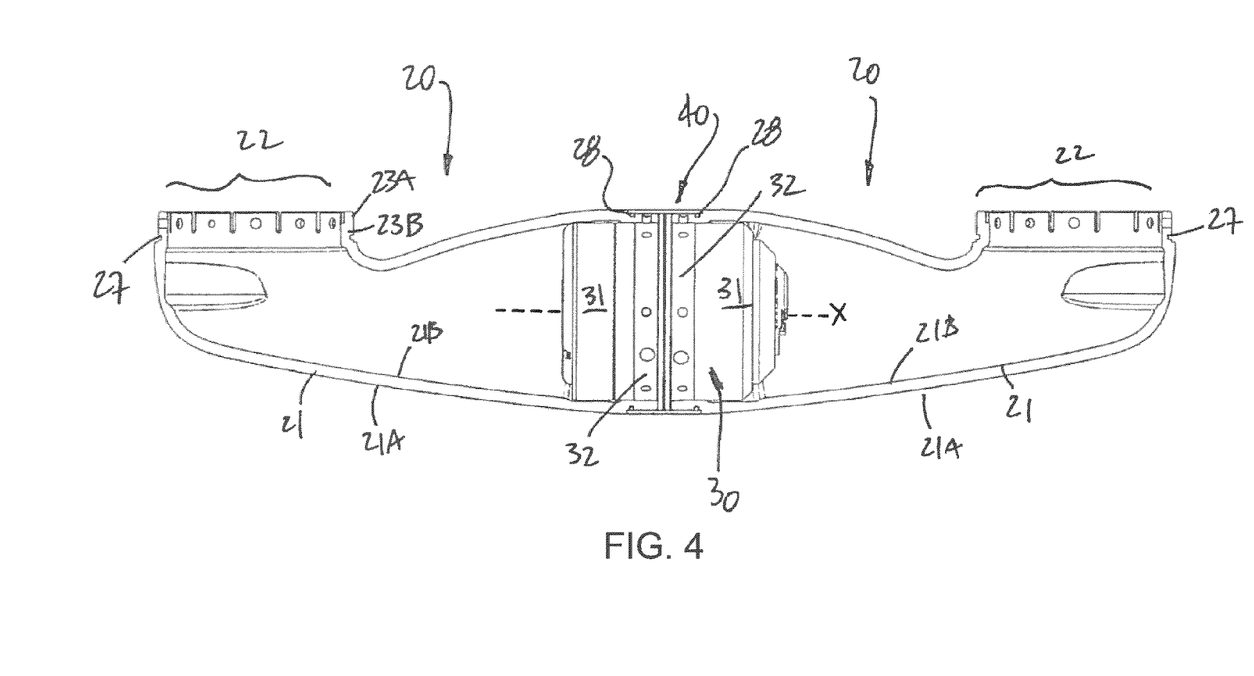
FIG. 4 is a sectional view of the pair of links of FIG. 2.
Figure 5:
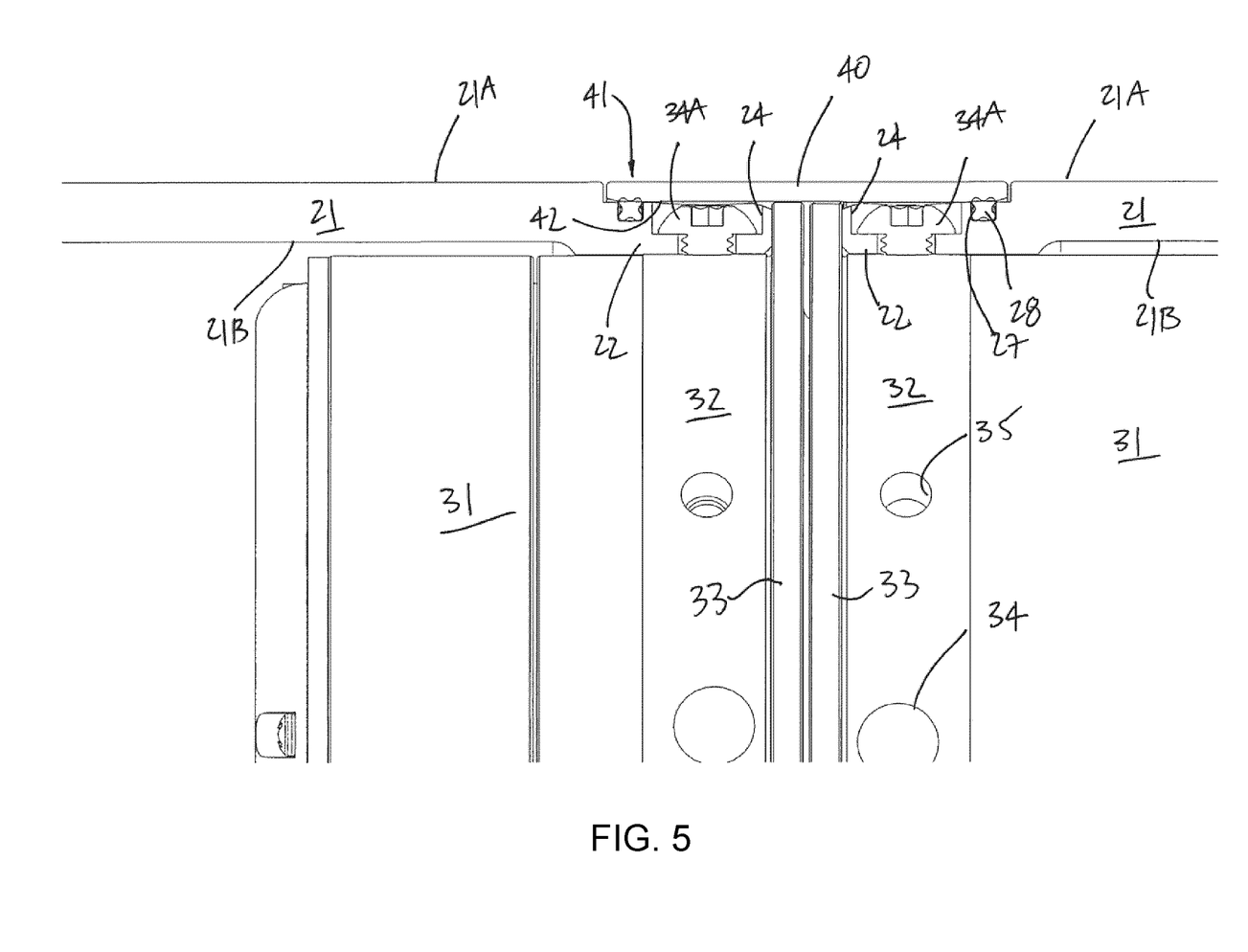
FIG. 5 is an enlarged sectional view of the pair of links of FIG. 2, showing radial alignment between a counterbored hole and bolt hole.
Figure 6:
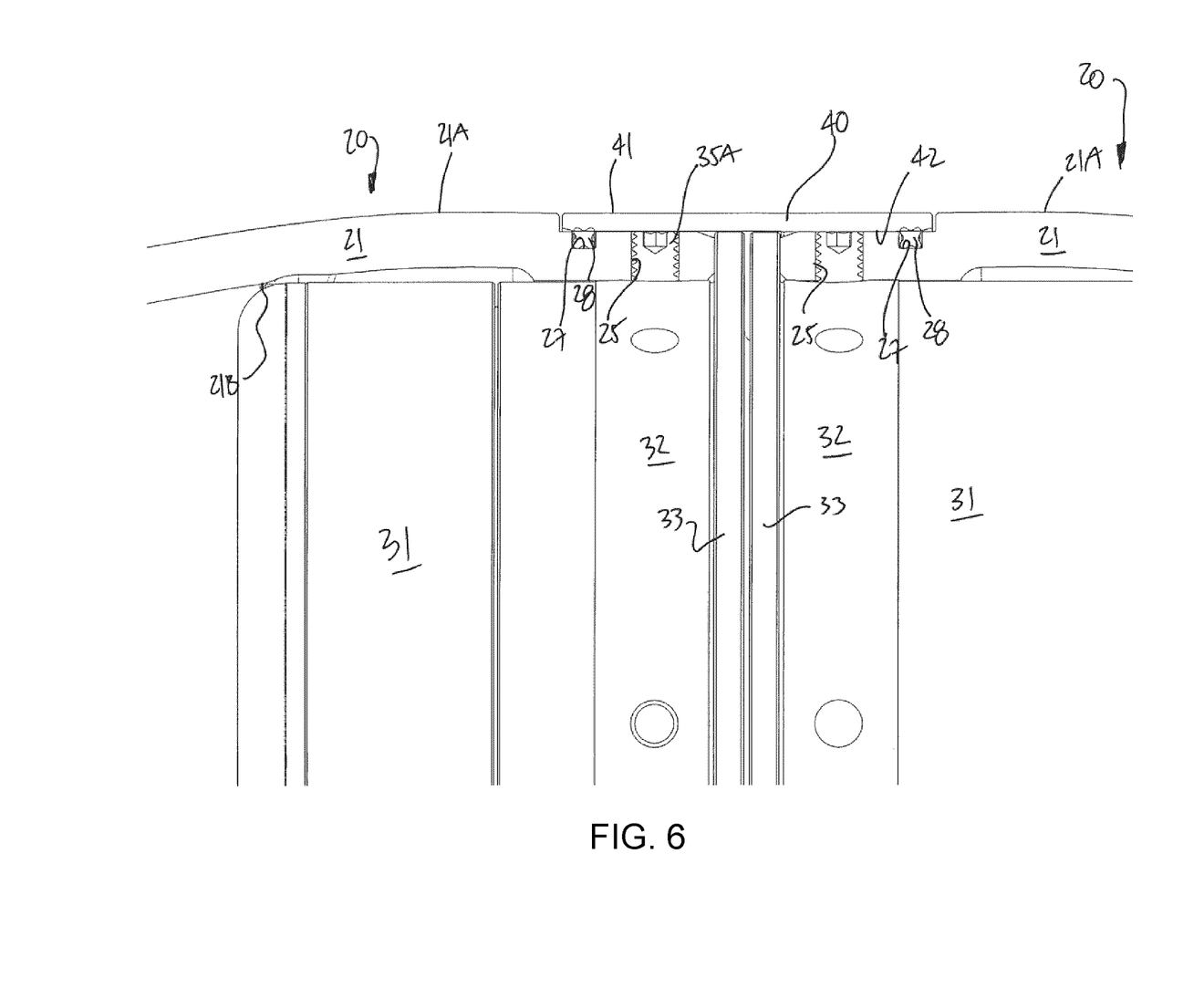
FIG. 6 is an enlarged sectional view of the pair of links of FIG. 2, showing radial alignment between a straight hole and set hole.

Referring to FIGS. 1-3, the links 20 are shown in greater detail. Each of the links 20 has a tubular body 21. An outer peripheral surface 21A of the tubular bodies 20 forms the majority of the exposed surface of the robot arm 10, with inner surfaces 21B delimiting the interior of the tubular bodies 21. The tubular bodies 21 may differ in length, in diametrical dimension, and in shape. For example, as shown in FIG. 1, some of the tubular bodies 21 may be generally straight, or may be angled, i.e., arranged such that the rotation angles of the motorized joint units 30 at their opposed ends are parallel, perpendicular, or at any other angle. Some tubular bodies 21 may be longer, shorter, etc. Also, although the open ends of the tubular bodies 21 may have the same diameter for all motorized joint units 30 to be the same size, it is contemplated to scale down the motorized joint units 30 from the proximal base end 12 to the distal effector end 11 to reduce the overall weight of the robot arm 10. In such a case, the diameter of the open ends of the tubular body 21 may incrementally reduce toward the distal end. The tubular bodies 21 may consist of any appropriate material, including composites, plastics, metals, or any combination thereof. The tubular bodies 21 may be monolithic pieces, or an assembly of components, and may be molded, extruded, machines, etc.

The open ends of the tubular bodies 21 may each have a connector 22. In the serial robot arm 10, all of the links 20 has two connectors 22, namely one at each end of their tubular bodies 21. There may be an exception for the link 20 at the base end 12, which may or may not have a connector 22 like the others. However, other arrangements are possible as well, including the absence of such a connector 22 in the link 20 at the effector end 11, although the connector 22 is shown in such location in FIG. 1. Likewise, the link 20 at the base end 12 may have a connector 22. In an embodiment, all motorized joint units 30 have the same size, and all connectors 22 are the same or mirror images of one another.

Referring to FIGS. 2 and 3, the connectors 22 are shown in greater detail. The connectors 22 may be annular in shape, with a circular section. The connectors 22 may each form a neck from the main outer peripheral surface 21A of the tubular bodies 21 they are a part of. Stated differently, a step is present from the main outer peripheral surface 21A to the connector 22, due to a larger diameter of the tubular bodies 21 at the main outer peripheral surface 21A immediately adjacent to the connectors 22. The step may be used to create a continuous smooth surface with the protective sleeve 40 as described herein. However, in some examples, the connectors 22 are used without the protective sleeve 40 and in such a case the junction between the outer peripheral surface 21A and the connectors 22 may be with or without the step. The connectors 22 may each have a crown shape, defined by a plurality of tabs 23A projecting axially from an annular base 23B of the connectors 22, the tabs 23A separated by slots.

Accordingly, this crown-shape arrangement allows some elastic deformation of the tabs 23A as they are connected to the motorized joint units 30, as described hereinafter, as the tabs' deformation capacity allows some cantilevering from the annular base 23B. The tabs 23A may support different types of connection bores, as a function of the fasteners used to connect the motorized joint units 30 to the connectors 22. For example, some or most of the tabs 23A may have counterbored holes 24, some or most of the tabs 23A may have straight holes 25, while one of the tabs 23A may have a plug hole 26. Some of the tabs 23A may also be without any hole, as observed in FIG. 3. In an embodiment, all connection bores may be the same in contrast to the arrangement shown in FIGS. 2 and 3.

An annular channel 27 is defined in the annular base 23B. The annular channel 27 is devised to receive therein an annular seal 28. There may be no annular channel 27, or more than one. The annular seal 28 may be any appropriate type of seal, such as O-ring, X-shaped ring, square-section ring, to seal an annular junction between the annular base 23B and the protective sleeve 40, as shown hereinafter. The annular seal 28 is made of an elastomer selected as a function of the contemplated use of the robot arm 10. For example, the selection of the annular seal 28 may depend on the temperatures to which the robot arm 10 will be subjected, the fluids that may contact the robot arm 10, etc. In an embodiment, the material of the annular seal 28 is selected for its low friction properties. For example, the annular seal 28 may consist of PTFE (polytetrafluoroethylene). Also, to assist in the alignment of the motorized joint unit 30 in the connector 22 as described herein, an axial key 29 may be defined in an inner cylindrical surface of each of the connectors 22, i.e., one at each end of the link 20, for complementary engaged in a corresponding keyseat as described below. The reverse arrangement is contemplated as well, as a keyway could be defined in the inner cylindrical surface of the connector 22. Other placement blocks or items may be used.

Referring to FIGS. 3-7, one of the motorized joint units 30 is shown in whole or in part. The motorized joint unit 30 is of the type having two casing shells 31, rotatable relative to one another along rotational axis X, as a response to actuation from the motorization components inside the motorized joint unit 30. Therefore, the two casing shells 31 are separated by a rotation plane, to which a vector of the rotational axis X is normal. For simplicity, the interior of the motorized joint unit 30 is not shown in detail, as any appropriate internal motor arrangement could be used. By way of example, U.S. Pat. No. 9,126,332, describes a possible motorized joint, and is incorporated herein by reference.

Each of the casing shells 31 of the motorized joint unit 30 has an annular connector surface 32 in which fastener bores are circumferentially distributed, to match the distribution of connection bores in the connectors 22. End flanges 33 may be at an end of the annular connector surfaces 32, and may assist in keeping the motorized joint units 30 axially aligned at the end of the tubular bodies 21, by forming a stop against axial displacement. This may prevent the motorized joint units 30 from being swallowed by the tubular bodies 21 during assembly, for example. The fastener bores emulate the sequence of connection bores in the connectors 22, if there is such a sequence of connection bores (as opposed to having a unique connection bore format). Therefore, the annular connector surface 32 may have bolt holes 34 to be paired with the counterbored holes 24, such that bolts or screws 34A may have their heads received in the counterbore of the counterbored holes 24, and their threaded shaft threadingly engaged in the bolt holes 34. The annular connector surface 32 may have set holes 35 to be paired with the straight holes 25, such that set screws 35A may be threadingly engaged in the set holes 35.

Figure 8:
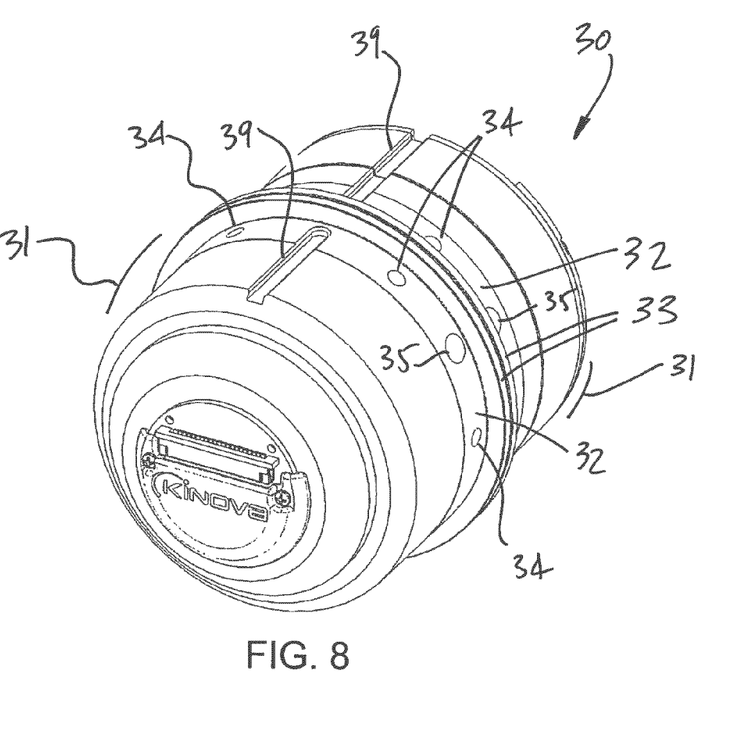
FIG. 8 is a perspective view of a motorized joint unit used in the articulated robot arm of FIG. 1.
Figure 9:
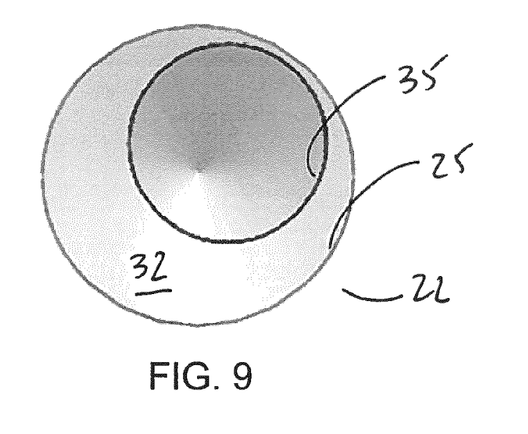
FIG. 9 is a schematic view showing an offset alignment of a straight hole relative to a set hole.

As shown in FIG. 3, normal bolts or screws 34A are used in conjunction with set screws 35A. The set screws 35A may be cone point set screws or flat head set screws with frusto conical body. Such set screws 35A are received in corresponding set holes 35 having a complementary conical or like tapering geometry. In this way, the orientation of the motorized joint unit 30 in the tubular bodies 21 may be auto-adjusted with precision due to the complementary abutment of the set screws 35A in the set holes 35, having a similar conical or tapering geometry. Therefore, the set screws 35A in the set holes 35 may be used for orientational alignment. The circumferential distribution of the set screws 35A adds to the precision of the orientational alignment between the motorized joint unit 30 and the tubular bodies 21. On the other hand, the sets of bolts/screws 34A and bolt holes 34 provide the structural integrity of the connection between the tubular bodies 21 and the motorized joint unit 30. The circumferential distribution of the bolts/screws 34A ensures the integrity of the connection of the motorized joint unit 30 and the tubular bodies 21. Moreover, as shown in FIG. 8, a keyseat 39 may be defined in the annular connector surfaces 32 of the casing shells 31 for radial alignment of the motorized joint unit 30 in the connector 22, the keyseat 39 receiving the key 29 of the connector 22 (FIGS. 2 and 3). According to FIG. 9, it is also contemplated to axially and/or radially offset the straight holes 25 relative to the set holes 35 (FIG. 9 shows both an axial offset and a radial offset). Thus, when the set screws 35A, threadingly engaged to the straight holes 25, are moved toward the conical end of the set holes 35, the cone point of the set screws 35A forces the connector 22 against the flange 33, to ensure abutment therebetween. The offset between the straight holes 25 and the set holes 35 may result from the cooperation between the key 29 and the keyseat 39. In an embodiment without such key 29 and keyseat 39, the offset between the straight holes 25 and the set holes 35 could be strictly axial.

When a pair of tubular members 21 is assembled end to end with a motorized joint unit 30 between them, as shown in FIGS. 4, 5, 6, and 7, the assembly is compact and robust. In particular, the connectors 22 may come into contact with the respective end flanges 33 of the motorized joint unit 30. In such an abutment stop between tubular bodies 21 and end flanges 33, the connection bores 24, 25 and the fasteners bores 34, 35 are axially aligned, i.e., they lie in a same plane to which a vector of the longitudinal axis is normal. As connectors 22 and annular connector surfaces 32 are circular, they may be rotated relative to one another until the corresponding connection bores 24, 25 and the fasteners bores 34, 35 are radially aligned. The appropriate fasteners 34A, 35A may then be screwed such that the tubular bodies 21 are fixed to the motorized joint unit 30. The outer diameter of the end flanges 33 is more or less equal to an outer diameter of the connectors 22, such that the sections of the robot arm 10 featuring sequences of connector 22—end flanges 33—connector 22 are of generally constant diameter.

The actuator cylindrical outer surface 32 mates with the shell cylindrical bore, i.e., the interior of the connector 22. This blocks two translational degrees of freedom. The conical set screws 35A screwed in the shells 31 mate into offset set holes 35 in the motorized joint unit 30 to push the set of reference surfaces of the unit 30 and of the link 20 together. The flange 33 of the unit 30 is pushed against the face of the connector 22, which blocks the third translation degree of freedom and two rotational degrees of freedom. Some rotational play may be present between the key 29 and the keyseat 39, whereby the side of the keyseat 39 of the unit 30 is pushed against the side of the key 29 in the link 20, blocking the last rotational degree of freedom. This allows an assembly between the unit 30 and the link 20 that is precise and repeatable.

Referring to FIGS. 4-7, the protective sleeve 40 is shown as covering the junction between adjacent links 20. The protective sleeve 40 may have a smooth substantially cylindrical outer peripheral surface 41, having more or less the same outer diameter as that of the outer peripheral surface 21A of the tubular bodies 21. Therefore, the robot arm 10 has a generally constant diameter at the joints between adjacent links 20, with at least a portion of the tubular bodies 21 adjacent to the sleeves 40 having the same outer diameter as the protective sleeve 40. A length or height of the protective sleeve 40, i.e., along a central axis of the sleeve 40, is sized for the sleeve 40 to lodge between the steps present at the transition between the main outer peripheral surfaces 21A and the connectors 22. Stated differently, the length or height of the protective sleeve 40 is generally equal to or slightly shorter than the axial length of two connectors 22 and of the end flanges 33 and space between them in the motorized joint unit 30.

An inner diameter of the protective sleeve 40 is sized for an inner peripheral surface 42 of the sleeve 40 to be in close proximity or in sliding contact with the annular base 23B of the connectors 22. Therefore, an annular sealed joint is formed between the sleeve 40 and the connectors 22 by the annular seals 28. As one or both of the connectors 22 will rotate relative to the connectors 22, the contact between the protective sleeve 40 and the connectors 22 should contemplate reduced friction, and fits such as interference fit and force fit should be avoided. In an embodiment, the sleeve 40 relies on the elastomeric properties of the annular seals 28 to be retained to the connectors 22, and there may be a slight diametric clearance between the sleeve 40 and the connectors 22. According to an embodiment, the sleeve 40 has a monolithic construction. According to another embodiment, the sleeve 40 may be made of a polymer, a composite, a metal. The sleeve 40 is rigid, i.e., it is more substantially more plastomeric than elastomeric. According to an embodiment, the sleeve 40 is made of a metal, such as aluminum. The inner peripheral surface 42 of the sleeve 40 may be coated with a low-friction coating, such as PTFE, among possibilities.

The protective sleeves 40 may have one or more holes 43. In the illustrated embodiment, there is one hole 43 per protective sleeve 40. The hole 43 is positioned along the protective sleeve 40 so as to be aligned with the connection bores 24, 25 on one of the connectors 22. Therefore, the protective sleeve 40 may be rotated relative to the links 20 to align the hole 43 with the connection bores 24, 25 to install and/or remove the fasteners 34A, 35A.

Figure 7:
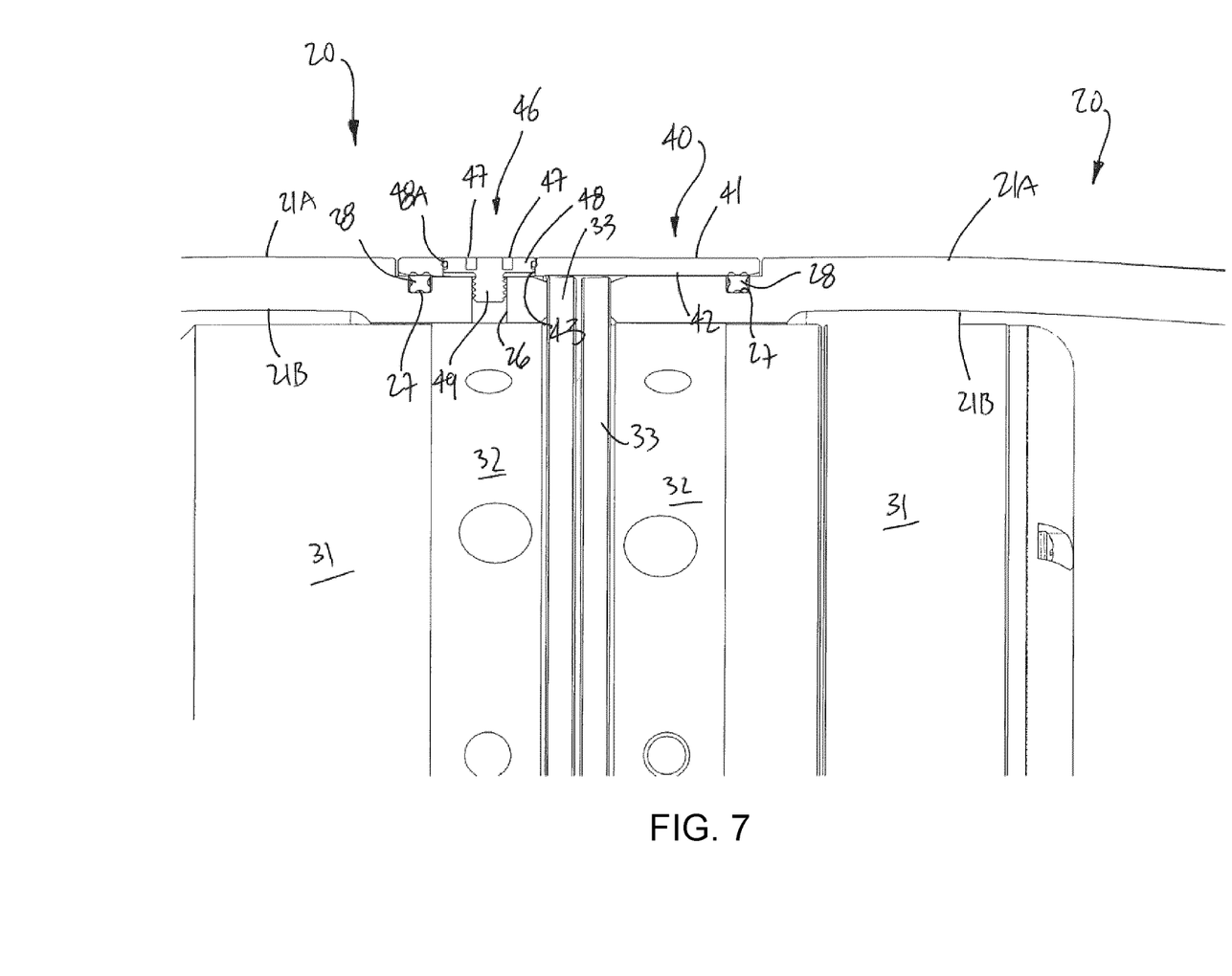
FIG. 7 is an enlarged sectional view of the pair of links of FIG. 2, showing alignment between a plug hole and a protective sleeve hole.

A plug 46 is provided to plug the hole 43 in the protective sleeve 40 when the robot arm 10 is assembled. The plug 46 seals the hole 43 for the protective sleeve 40 to be liquid resistant. Accordingly, the plug 46 may consist of a material such as a polymer, rubber or metal. The plug 46 may have a pair of pin holes 47 in its flange head 48 so as to be installed to or removed from the hole 43 in the sleeve 40. Other grasping features may be present as well, such as hexagonal socket, or proprietary-shape socket. The plug 46 may further include a seal or seals 48A in the flange head 48 to seal the annular space between the flange head 48 and the periphery of the hole 43. In such an arrangement, the seals 48A may have greater elastomeric properties than the plug 46 to seal the annular gap. Alternatively, the plug 46 may have a monolithic construction providing suitable sealing properties. A nipple 49 may project from the flange head 48 and be sized to be received in the plug hole 26 of the connector 20 (FIG. 7). The nipple 49 may be barbed as in FIG. 7, to increase traction between the nipple 49 and the plug hole 26. Alternatively, the nipple 49 may be threaded, for screwing engagement with corresponding threading in the plug hole 26. Therefore, by way of the penetration of the plug 46 in the plug hole 26, the sleeve 40 is fixed in rotation relative to one of the links 20.

Now that structural components of the robot arm 10 have been described, a method for assembling or dissembling links 20 is set forth.

One of the motorized joint units 30 has a half, i.e., one of the casing shells 31, received in a free open end of the tubular body 21 of a link, until abutment between the connector 22 and the end flange 33. Connection of wiring of the half of the motorized joint unit 30 received in the tubular body 21 may have been done prior to the positioning of the motorized joint unit 30 as cables, if present, may be internally routed in the links 20. Once the motorized joint unit 30 has one of its casing shells 31 in the tubular body 21, appropriate fasteners 34A, 35A secure the motorized joint unit 30 to the connector 22, and thus to the link 20. It may be required that the motorized joint unit 30 be rotated on itself when received in the tubular body 21, such that corresponding connection bores 24, 25 and fasteners bores 34, 35 are radially aligned, prior to the securing with the appropriate fasteners 34A, 35A. If fasteners 34A and 35A are used, the fasteners 35A may be fastened first, to ensure the correct orientational alignment between the casing shell 31 and the link 20, before tightening the assembly with the fasteners 34A. The rotation on itself may not be required if a key 29/keyseat 39 is present.

The protective sleeve 40 may then be slid onto the assembly of the link 20 and motorized joint unit 30, into sealing engagement with the annular seal 28. If the protective sleeve 40 has a single plug hole 43, the sleeve 40 is oriented for the plug hole 43 to be away from the link 20 supporting the motorized joint unit 30. The adjacent link 20 may then be installed, and has its connector 20 slid into the annular gap between the free end of the protective sleeve 40 and the annular connector surface 32 of the motorized joint unit 30. The seal 28 has been installed on the link 20 prior to the installation of the link 20, such that the sealed joint is formed at installation. It may be required that the motorized joint unit 30 be rotated on itself when received in the tubular body 21, such that corresponding connection bores 24, 25 and fasteners bores 34, 35 are radially aligned, prior to the securing with the appropriate fasteners 34A, 35A. Likewise, as the protective sleeve 40 covers the connector 22, the protective sleeve 40 may also be rotated to have its hole 43 aligned with one set of connection bores 24, 25 and fasteners bores 34, 35. Once a first of the fasteners 34A, 35A secures the motorized joint unit 30 to the connector 22, the protective sleeve 40 is rotated incrementally for all or a sufficient number of fasteners 34A and/or 35A to be installed. Then, the plug 46 may be installed when the hole 43 is aligned with the plug hole 26.

In order to dissemble one of the links 20 from another, the plug 46 is firstly removed, to expose the connection bores 24, 25 and fasteners 34A, 35A. The fasteners 34A, 35A are then removed one by one. When the fasteners 34A, 35A are removed, the link 20 may be pulled out of engagement with the motorized joint unit 30. The protective sleeve 40 may then also be pulled out to expose the connector 22 on the other link 20.

Alternative configurations are contemplated. For example, the connectors 22 may be without the tabs 23A or without the annular base 23B. For example, the tabs 23A could project directly from the portion of the tubular body 21 having the outer peripheral surface 21A, i.e., exposed when the protective sleeve 40 covers the joint between links. In such a case, the annular seals 28 may be installed in an annular channel in the inner surface 42 of the protective sleeve 40. Such a seal would have the necessary structural integrity to remain in the annular channel. The sealing may also be done by a tight connected between the inner surface of the protective seal 40 and the outer surface of the connectors 22.

The protective sleeve 40 overlaps the rotational plane between links 20, and covers all structural fasteners, i.e., the fasteners 34A and 35A. Accordingly, other than the non structural plugs 46, an exterior of the robot arm 10 may show no fasteners at the joints covered with the protective sleeves 40.

While the various components of the robot arm 10 are described concurrently as being part of a common robot arm, it is contemplated to use some of the components without others. For example, the robot arm 10 may be without the sleeve 40, but with the connectors 22 and/or the self-aligning arrangement of fasteners 34A and 35A.

In an embodiment, the connectors 22 are threaded, such that the links 20 are screwed onto corresponding threading on the motorized joint unit 30, with the protective sleeve covering the joint between the links 20 and the motorized joint unit 30. In such an embodiment, no additional fasteners may be required.

The invention claimed is:

1. An assembly of links and motorized joint unit of a mechanism, comprising:
    at least pair of links, each said link having a tubular body, at least one end of each of the tubular body being an open end having at least one connector;
    a motorized joint unit having
        a first portion received in the open end of the tubular body of a first of the links, the motorized joint unit secured to the at least one connector of the first of the links,
        a second portion rotatable relative to the first portion by actuation of the motorized joint unit, the second portion received in the open end of the tubular body of a second of the links, the motorized joint unit secured to the at least one connector of the second of the links; and
    a protective sleeve having a tubular body rotatably mounted over the at least one connector of each of the first and the second link, the protective sleeve concealing the connectors and a joint between the pair of links, the tubular body including a monolithic annular construction.

2. The assembly according to claim 1, wherein the protective sleeve and a portion of each of the links adjacent to the protective sleeve all have a constant outer diameter.

3. The assembly according to claim 1, wherein the at least one connector of each of the links is secured to a respective one of the first portion and of the second portion of the motorized joint unit by at least one fastener.

4. The assembly according to claim 3, wherein the protective sleeve has a single hole in an outer lateral surface thereof, the single hole being axially aligned with the at least one fastener of either one of the first link and the second link.

5. The assembly according to claim 4, wherein a plug is received in the hole to plug the hole.

6. The assembly according to claim 5, wherein the plug is made of a polymeric material.

7. The assembly according to claim 3, wherein the protective sleeve has at least one hole in an outer lateral surface thereof, the at least one hole being axially aligned with the at least one fastener of either one of the first link and the second link.

8. The assembly according to claim 1, wherein each of the connector has an annular base extending from a remainder of the tubular body, a diameter of the annular base being less than an outer diameter of a portion of the tubular body from which the annular base projects, to form a step.

9. The assembly according to claim 8, wherein an annular channel is defined in the annular base, an annular seal being received in the annular channel for sealing a junction between the protective sleeve and the annular base.

10. The assembly according to claim 1, wherein each of the connectors has a plurality of tabs projecting axially from the tubular body, the tabs having fasteners holes for receiving fasteners to secure the links to the motorized joint unit.

11. The assembly according to claim 10, wherein the tabs are sized to elastically deform when secured to the motorized joint unit by the fasteners.

12. The assembly according to claim 10, wherein at least two of the fasteners holes have different diameters.

13. The assembly according to claim 12, wherein a first series of the fasteners holes receives alignment set screws with tapering end, the motorizing joint unit having a hole with corresponding tapering geometry.

14. The assembly according to claim 1, further comprising a set of key and keyseat between the links and the corresponding ones of the first portion and of the second portion of the motorized joint unit for rotational alignment.

15. The assembly according to claim 1, wherein the protective sleeve is made of a rigid material having a constant outer diameter.

16. The assembly according to claim 1, wherein the connector of the first link at the motorized joint is a mirror image of the connector of the second link at the motorized joint.

17. The assembly according to claim 1, wherein the connector of the first link at the motorized joint is the same as the connector of the second link at the motorized joint.

18. The assembly according to claim 1, wherein the motorized joint unit has a pair of end flanges at a junction between the first portion and the second portion, the connectors of the links abutting against the end flanges.

19. The assembly according to claim 1, wherein the protective sleeve is connected to the first of the links to rotate with the first of the links relative to the second of the links.

20. The assembly according to claim 1, wherein each of the links has two of the open end, with one said connector at each of the open end, wherein the connectors at the two ends of any one of the links have a same diameter.

* * * * *